United States Patent
Lyberg et al.

(10) Patent No.: US 6,385,580 B1
(45) Date of Patent: May 7, 2002

(54) METHOD OF SPEECH SYNTHESIS

(75) Inventors: Bertil Lyberg, Vagnharad; Mats Wiren, Stockholm, both of (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/381,630

(22) PCT Filed: Mar. 20, 1998

(86) PCT No.: PCT/SE98/00507

§ 371 Date: Nov. 18, 1999

§ 102(e) Date: Nov. 18, 1999

(87) PCT Pub. No.: WO98/43236

PCT Pub. Date: Oct. 1, 1998

(30) Foreign Application Priority Data

Mar. 25, 1997 (SE) .............................................. 9701102

(51) Int. Cl.⁷ .............................................. G10L 13/00
(52) U.S. Cl. ........................ 704/258; 704/266; 704/276
(58) Field of Search ................................ 704/270, 275, 704/258, 260, 276, 277, 266, 265, 272, 278

(56) References Cited

U.S. PATENT DOCUMENTS

| | | | | |
|---|---|---|---|---|
| 4,841,575 A | * | 6/1989 | Welsh et al. ................ | 704/278 |
| 5,657,426 A | * | 8/1997 | Waters et al. ............... | 704/270 |
| 5,826,234 A | | 10/1998 | Lyberg ....................... | 704/277 |
| 6,208,356 B1 | * | 3/2001 | Breen et al. ................ | 345/473 |

FOREIGN PATENT DOCUMENTS

| | | | |
|---|---|---|---|
| EP | 0 624 865 | 11/1994 | |
| EP | 0 664 537 | 7/1995 | |
| EP | 0 710 929 | 5/1996 | |
| EP | 0 778 560 | 6/1997 | |
| GB | 2 231 246 | 11/1990 | |
| GB | 2231246 | * 11/1990 | ........... G06F/15/72 |
| GB | 2 250 405 | 6/1992 | |
| WO | WO 97/34292 | 9/1997 | |

* cited by examiner

Primary Examiner—Richemond Dorvil
(74) Attorney, Agent, or Firm—Oblon, Spivak, McClelland, Maier & Neustadt, P.C.

(57) ABSTRACT

A method of speech synthesis for reproduction of facial movements of a person with synchronized speech synthesis. The speech is put together of polyphones that are taken from a database. A databank is established containing polyphones with the polyphones belonging to facial movement patterns of the face of a first person. Polyphones from a second person are also registered and stored in the database. The duration of sound segments in corresponding polyphones in the databank and the database are compared and the facial movements in the databank are modified in accordance with the deviation. The modified facial movements are stored in the databank and related to the polyphone in question. These registered polyphones are then utilized to put together words and sentences at the same time as corresponding facial movements build up a face model from the modified facial movements in the databank.

12 Claims, 2 Drawing Sheets

METHOD OF SPEECH SYNTHESIS

BACKGROUND OF THE INVENTION

1. Field of the Invention

The present invention relates to reproduction of speech and to the speech belonging facial movements of a speaking person. The invention is intended to be utilized in connections where a person s facial movements shall be reproduced simultaneously with produced sound.

2. Discussion of the Background

At speech synthesis there is a need to synchronize the speech with the facial movements of a speaking person. In patent application No. 9504367-5 is described how movement patterns in a face are recorded and stored together with a polyphone collection (sounds) at concatenation synthesis based on half-syllables. The recording of the movement patterns of the half-syllables of the subject (person) after that influences points in a polygon model of the face. Another texture, i.e. another face can be applied on top of the polygon model and at that get lip and facial movements from the polyphone synthesis.

With the described model is required that voices of men, women and children are recorded separately. Such procedures are expensive and circumstantial.

SUMMARY OF THE INVENTION

The present invention, and with reference to FIG. 3, relates to a method at speech synthesis for reproduction of facial movements of a person who has been allocated a speech via speech synthesis. Said speech is put together of polyphones which are fetched from a database (step S1). A databank is further established containing polyphones with to the polyphones belonging movement patterns in the face of a first person (step S2). Polyphones from a second person are further registered and stored in a database (step S3). The sound segments in corresponding polyphones in the databank and the database are compared (step S4), and the facial movements in the databank are modified in accordance with the deviation (step S5). The modified movement patterns are stored in the database and are related to the polyphone in question (step S6). The registered polyphones are after that utilized for putting together words and sentences at the same time as corresponding movement patterns build up a face model from the movement patterns in the database (step S7).

Speech from a subject (person) is recorded at the same time as the movement pattern of the subject is registered. The recorded speech preferably consists of nonsense words from which polyphones, half-syllables, are sorted out. The registered polyphones are stored in a polyphone bank. To each polyphone is further stored in a movement bank the facial movements of the subject. For a second person is in corresponding way polyphones registered in a polyphone base. The second person's facial movements, however, are not registered. A comparison between the sound segments in corresponding polyphones is after that made between the polyphone base and the polyphone bank. The registered differences are after that utilized to modify current movement pattern in the movement bank, at which a model with a movement pattern corresponding to the second speaker's pronunciation of the polyphones is obtained. The modified movement pattern is stored in a movement base. At putting together polyphones from the polyphone base, the movement base is after that utilized for creating of a face model, the movements of which correspond to the speaking person's way of speaking. The created model consists of a polygon model based on the movement pattern from the movement pattern of the first subject. In order to create a vision of that the second person is speaking, a picture of the speaker is applied to the model. The polygon model is at that modified to adapt to the second person. The to the model applied picture can consist of stills or moving pictures which have been stored in the database or have been transferred via, for instance, the telecommunication network. A three-dimensional picture is in this way created.

The registered movements in the first face consist of points which have been arranged in a three-dimensional face model. The face model consists of a number of polygons out together by points. The points consist of measuring points in the face of a subject, which points are registered during recording of sounds/polyphones. The registering of the points in the face of the subject is preferably made by marking of selected points in the face of the subject. The points after that are registered by means of, for instance, laser technology, and a bank over sounds and movement patterns is created.

The field of use of the invention is all cases where a reproduction of sound/speech shall be given a lifelike movement pattern in a speaking person's face. It can, for instance, relate to a person who is speaking a first language, but who by means of speech synthesis is represented speaking a second language. Such conditions should in the future be associated with telephony where the telecommunication system or equipments at the phoning persons translate the speech and represent the speaking persons in picture. The field of use of the invention, however, is not only telephony, but all connections where a first speech produced by a person shall be translated and reproduced in a second language with lifelike facial movements.

The indicated invention makes possible that a cheaper procedure can be applied at animation of speech with a belonging face. This is utilized, for instance, at translation of a speaking person's speech at translation from a first language to a second language. At recording is required only one subject who is utilized for production of the basic movements in the face. The person/persons who shall borrow the movement pattern from the subject need only record a number of sound sequences from which polyhones can be extracted. By registering polyphones and belonging facial movements of a suitable selection of persons, a bank can be created which can be utilized in different situations for animation of different faces. The registered faces can for instance relate to different persons of different ages and of different sex.

DETAILED DESCRIPTION OF THE PREFERRED EMBODIMENTS

Figure 1:
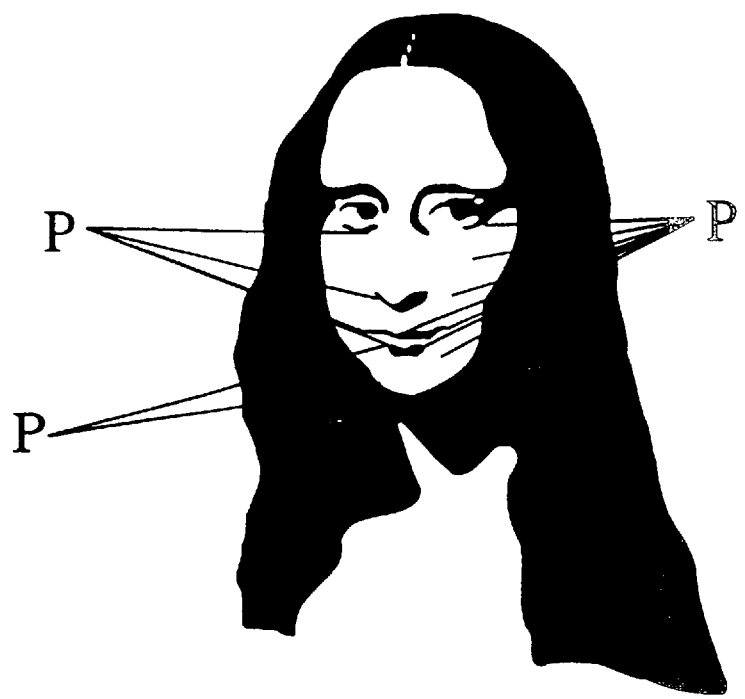
FIG. 1 shows how the facial movements are registered.
Figure 2:
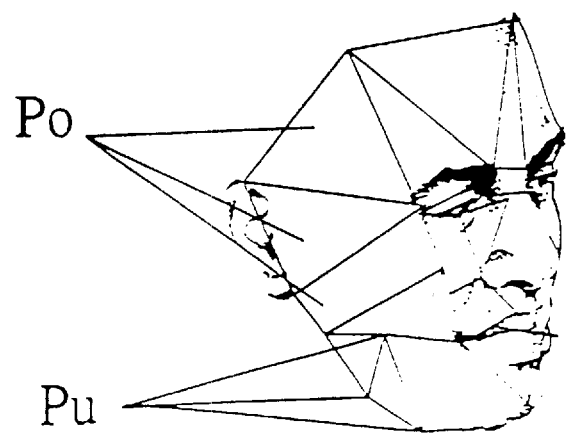
FIG. 2 shows how a polygon model is built up.
Figure 3:
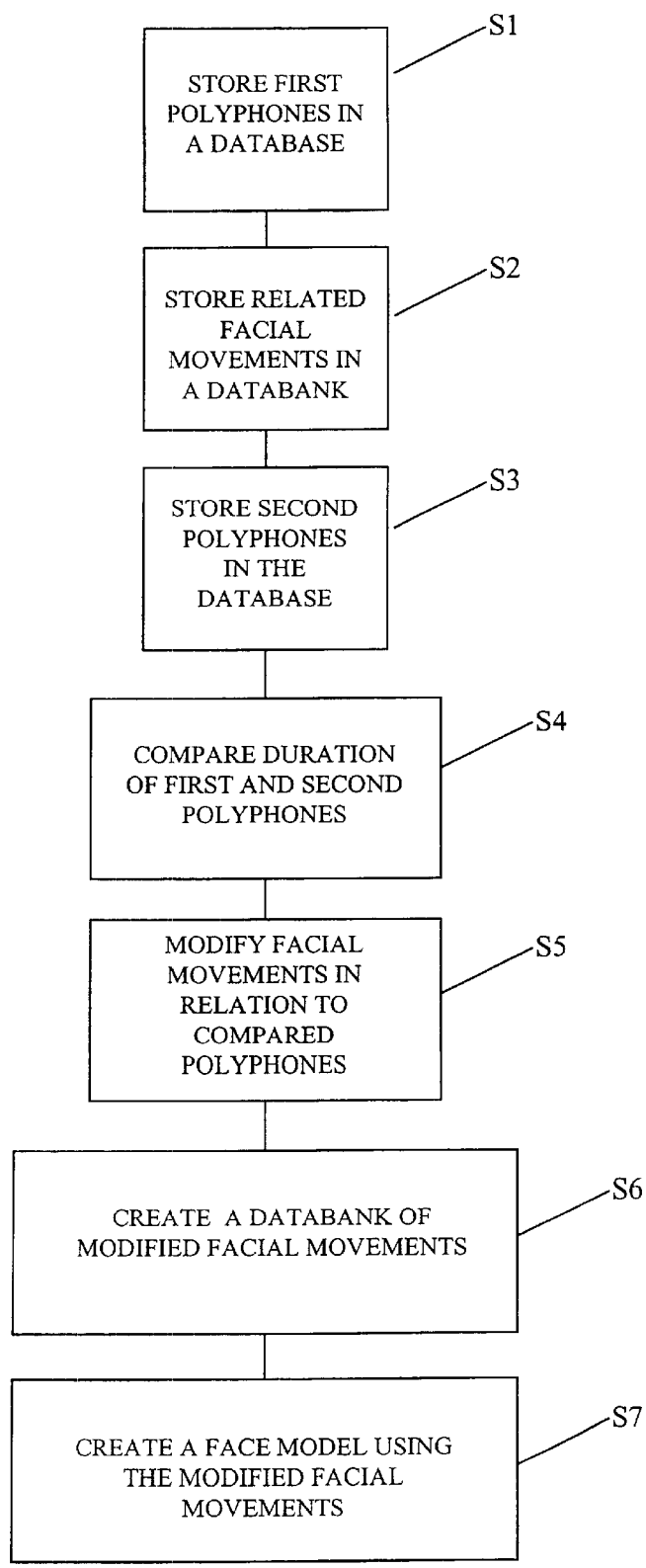
FIG. 3 shows a flow diagram of the method steps of the claimed invention.

In the following the invention is described on basis of the figures and the terms in them.

Registering of sounds with belonging movement patterns of the face of a subject is performed by utilization of, for instance, nonsense words, or from running text. Using nonsense words has advantages in that the subject at both production of words as well as facial expressions takes a neutral position. The nonsense words principally consist of one-syllable words which are divided into half-syllables. The half-syllables are linked together to words and sentences. Linking of two half-syllables is made in the middle of the vowel for respective half-syllable. The creating of a word is made according to the following; first the half-syllables which shall be part of the word, as well as the accentuation of the word in question, are found out. A single word, for instance "nod" (nu:d) is divided into the following syllables, "no", "od". Linking of "no" and "od" is after that made in the vowel "o". From language dictionary, information is obtained about the lexical accent of the word. Said sounds after that are put together to words and sentences where the accent of each word is produced, as well as the sentence intonation of the whole sentence is determined. A build-up of words and sentences according to this procedure is previously known and described in i.a. patent document Se 9504367-5.

In order to create a polyphone bank, a subject is utilized who speaks a large number of words, for instance nonsense words. Alternatively also running text can be utilized. At the same time as said words are registered, also the facial movements of the subject are registered. These facial movements are stored in a movement base. The recorded words are divided into polyphones, half-syllables together with corresponding movements. A connection between the polyphones and corresponding movements is in this way created.

Registering of the facial movements is made by marking of different points in the face of the subject. The points are placed tighter where big changes are taking place, and with larger spaces in areas with smaller deviations in the movements. Areas with large deviations are for instance the area around the lips, and the movements of the lips. Each of the points is given a position in a three-dimensional reproduction of the subject. The picture only constitutes a polygon model of the face. By coordinating the model with polyphones which are put together to words and sentences, a movement pattern which corresponds to the produced one is obtained.

Polyphones are further registered from a second person, however without registering of the facial movements of the second person. Also in this case nonsense words are preferably used, but running text can also be utilized. A polyphone base is in this way created for the second person. In order to create a movement base for the second person, after that the polyphone bank for the first subject is utilized. Corresponding polyphones in the polyphone bank and the polyphone base are compared with regard to the duration of the sounds. Deviations in duration are registered for the polyphones, after which corresponding movements in the movement bank are modified. The modified movement is after that stored in a movement base. The movement base and the polyphone base are at that connected to each other.

When the second person shall be animated, words and phrases are produced by putting together half-syllables taken from the polyphones. At the same time a three-dimensional polygon model is built up with corresponding movement patterns which have been taken from the movement base. The created picture consists of a thread-model where the end points in the polygons represent the measuring points in the face of the first subject.

To create a vision of that the second person produces the produced speech, a picture of the second person is applied is to the polyphone model. The polygon model is modified in connection with that to adjust to facial forms, size of the mouth etc, of the second person. The produced reproduction is three-dimensional and is shown simultaneously with the produced speech, at which speech and facial movements well correspond. The indicated method, however, does not allow that the movement pattern quite corresponds to the second person's normal movement pattern, but is characterized by the movement pattern of the first person.

A person, B, is speaking a first language which shall be translated to a second language, or a text is given and shall be allotted the person B. For the person, B, a polyphone bank has been created, but no movement patterns have been registered. The for B registered polyphones are compared with corresponding polyphones in a polyphone base with associated movement patterns of a person, A. The exact length of the sound segments are found out both in the polyphone bank and the polyphone base. The deviations are registered and a model face is created where the movement patterns from A are utilized. The movements, however, are modified in relation to the deviation between the polyhones in the polyphone bank and the polyphone base. Sound segments which are longer in the polyphone bank than in the polyphone base result in that corresponding movement pattern in the face model is extended. For sound segments which are shorter in the polyphone bank than in the polyphone base, a corresponding reduction of corresponding movement pattern in the model face is made. A base with movement patterns associated to the polyphone bank is in this way created. At putting together polyphones from B's polyphone bank to words and sentences, a model face with movements taken from the base with movement patterns is produced. The produced movement patterns correspond to B's way of pronouncing corresponding parts of the polyphones, but with A's basic movement pattern. B's face after that can be applied to the model, at which B speaks with his/her own voice, but is allotted a movement pattern belonging to A, at which picture and sound correspond to each other and a lifelike experience is obtained.

The invention is not limited to the above described example of embodiment, or to following patent claims, but may be subject to modifications within the frame of the idea of invention.

What is claimed is:

1. A method of speech synthesis comprising:

storing first polyphones in a database and storing related facial movements from a first person in a databank;

storing second polyphones from a second person in the database;

comparing a duration of sound segments of the first and second polyphones in the database;

modifying the facial movements in relation to compared first and second polyphones;

creating a databank of modified facial movements; and utilizing the databank of modified facial movements to create a face model with corresponding facial movements and sounds.

2. The method according to claim 1, further comprising:

determining a difference in the duration of the sound segments in corresponding polyphones.

3. The method according to claim 2, further comprising:

taking the facial movements for a polyphone from the facial movements in the databank; and modifying the facial movements in relation to the difference in duration of the sound segments in different parts of the polyphone.

4. The method according to claim 3, wherein modified facial movements are stored in the databank.

5. The method according to claim 1, further comprising:

combining polyphones from the database to form words and sentences that correspond to facial movements from the databank; and applying a face model that has a one-to-one correspondence between the words, the sentences, and the facial movements.

6. The method according to claim 1, further comprising:

registering the facial movements in a first face by marking a number of points on the first face; and registering the facial movements at a same time as recording the sound.

7. The method according to claim 6, wherein the facial movements are registered by laser technology configured to follow marked points on the first face.

8. The method according to claim 6, wherein a picture of a second face includes at least one of a still picture and a moving picture.

9. The method according to claim 1, wherein a picture of a second face is one of introduced, transferred, and taken from the databank.

10. The method according to claim 1, further comprising:

building up a face model as a polygon model;

applying a picture of the second person to the polygon model; and making the facial movements of the second person correspond to the sounds produced.

11. The method according to claim 10, wherein the polygon model is three-dimensional, a three-dimensional picture of a real face is obtained after application of a first picture, and a second picture corresponds to the facial movements of a person whose face corresponds to the first picture.

12. The method according to claim 10, wherein points in the polygon model represent areas in a first face with facial movements that depend on each other, and adjustment of the facial movements relates to at least one of a scope of the facial movements and a distance that exists between the points in the polygon model of a first face and a real face.

* * * * *